(12) United States Patent
Tansungnoen et al.

(10) Patent No.: US 11,739,026 B2
(45) Date of Patent: Aug. 29, 2023

(54) LIGHTWEIGHT FIBER-REINFORCED CEMENT MATERIAL

(71) Applicant: TPI Polene Public Company Limited, Bangkok (TH)

(72) Inventors: Soontorn Tansungnoen, Nakhon Ratchasima (TH); Verasak Mosungnoen, Nakhon Ratchasima (TH)

(73) Assignee: TPI Polene Public Company Limited

( * ) Notice: Subject to any disclaimer, the term of this patent is extended or adjusted under 35 U.S.C. 154(b) by 194 days.

(21) Appl. No.: 16/951,672

(22) Filed: Nov. 18, 2020

(65) Prior Publication Data
US 2021/0355029 A1    Nov. 18, 2021

(30) Foreign Application Priority Data
May 15, 2020   (TH) ................................ 2001002669

(51) Int. Cl.
| | |
|---|---|
| *C04B 16/06* | (2006.01) |
| *C04B 7/00* | (2006.01) |
| *C04B 14/06* | (2006.01) |
| *C04B 14/22* | (2006.01) |
| *C04B 14/28* | (2006.01) |
| *C04B 16/02* | (2006.01) |

(52) U.S. Cl.
CPC ............ *C04B 16/0641* (2013.01); *C04B 7/00* (2013.01); *C04B 14/06* (2013.01); *C04B 14/22* (2013.01); *C04B 14/28* (2013.01); *C04B 16/02* (2013.01); *C04B 16/0633* (2013.01); *C04B 2201/20* (2013.01); *C04B 2201/50* (2013.01)

(58) Field of Classification Search
None
See application file for complete search history.

(56) References Cited

U.S. PATENT DOCUMENTS

| | | | | |
|---|---|---|---|---|
| 8,038,790 | B1* | 10/2011 | Dubey | B28B 23/0087 106/711 |
| 2005/0241540 | A1* | 11/2005 | Hohn | B63H 3/008 106/805 |
| 2009/0162602 | A1* | 6/2009 | Cottier | E04C 2/06 428/411.1 |
| 2012/0034441 | A1* | 2/2012 | Adzima | C04B 14/42 523/401 |
| 2012/0312195 | A1* | 12/2012 | Hohn | C04B 28/02 106/805 |
| 2015/0239780 | A1* | 8/2015 | Bar Moav | C04B 16/0641 523/219 |
| 2017/0297959 | A1* | 10/2017 | Bar Moav | C04B 16/0633 |

FOREIGN PATENT DOCUMENTS

| | | |
|---|---|---|
| TH | 4075 | 3/2008 |
| TH | 166730 | 8/2017 |

* cited by examiner

*Primary Examiner* — John J Figueroa
(74) *Attorney, Agent, or Firm* — Kim IP Law Group LLC

(57) ABSTRACT

The present invention provides a fiber-reinforced cement composition comprising; cement, fiber, silica, filler, expanded perlite, and polymer. The fiber-reinforced cement composition according to the present invention has low density, high toughness and flexural strength, and not contains volatile composition. When it is molded into workpiece, the workpiece is lightweight, easy to cut and/or lathed into desired shapes, drilled and fixed with screws and/or repeatedly nailed at the same position, tolerant to humidity, termites and insects, inflammable and does not produce powder when cut, drilled and/or lathed that is hazardous to the workers. Therefore, it is suitably applicable for being utilized as a material for manufacturing furniture parts.

22 Claims, No Drawings

LIGHTWEIGHT FIBER-REINFORCED CEMENT MATERIAL

CROSS-REFERENCE TO RELATED APPLICATIONS

This application claims priority to Thailand Patent Application No. 2001002669 filed May 15, 2020, the disclosure of which hereby being incorporated by reference in its entirety for all purposes.

INCORPORATION BY REFERENCE TO ANY PRIORITY APPLICATIONS

This application claims the benefit of Thai Patent Application No. 2001002669, filed May 15, 2020, the disclosure of which is hereby incorporated by reference in its entirety.

BACKGROUND

Field

The present invention relates to a composite material, particularly, a lightweight fiber-reinforced cement material.

Description of the Related Art

Recently, there has been expansion in residential construction both in the forms of housing estates and condominium complexes to fulfill the growing population needs. The same is true for the need for furniture that grows to meet the behaviors of modern customers who are likely to choose residences with furniture included. The materials used in the manufacture of furniture for interior decoration of residences can be categorized into several types, such as natural wood, synthetic wood, or plastic etc. These materials may be trimmed or covered with leather or other surface covering materials to make them beautiful. Synthetic wood materials, such as medium density fiberboard (MDF), plywood, laminated wood, particleboard, and plastic are materials commonly used in the manufacture of furniture parts owing to their cheap availability, light weight, and easy-to-cut and easy-to-assemble properties, but the drawbacks are short service life as they are not tolerant to humidity or fungus, termite consumable as well as being flammable.

With the aim of overcoming the above-mentioned drawbacks, there have been developments in utilizing fiber-reinforced cement materials as a replacement for natural wood and synthetic wood materials in the manufacture of furniture parts. The utilization of fiber-reinforced cement materials makes it possible to obtain furniture products that are tolerant to humidity, fungus and termites as well as being inflammable. However, other drawbacks are introduced. For instance, due to the higher density of fiber-reinforced cement materials (i.e. approximately 1.2 to 1.7 $g/cm^3$, in general) compared to the density of natural wood and synthetic wood materials, a furniture product made of fiber-reinforced cement material has a higher weight in the same volume compared to those made of natural wood or synthetic wood materials, and hence results in inconvenience in moving and transporting. Further, fiber-reinforced cement materials are not easy to cut into the shapes of furniture products, and make it difficult to fix furniture products using nails or screws. These drawbacks have led attempts to develop fiber-reinforced cement materials that are light weight, easy to be cut, drilled for screws or nailed, while maintaining the properties of tolerance to humidity, fungus, termites and insects, as well as being inflammable.

In the prior art, the developments toward lowering the density of fiber-reinforced cement materials have been made by utilizing materials with a density of about 0.8 $g/cm^3$ or less, such as expanded perlite, expanded vermiculite, volcanic ash, hollow ceramic microspheres, etc., as a constituent material. In Thai Petty Patent No. 4075, there is provided a fiber-reinforced cement material containing ground rice husk, which is utilized for molding of tile products. The tile products are light weight with a density of 0.89 $g/cm^3$, which is approximately the density of wood materials, a look-alike wood appearance, and less force for driving nails. However, their toughness is lowered, and hence the products cannot be re-fixed back into the same screw position several times as required in furniture part applications. Further, Thai Patent Application No. 1401004753 discloses a lightweight tile product which is molded from a fiber-reinforced cement material comprising rice husk ash or agricultural waste ash. The tile product has a density of approximately 1.2 $g/cm^3$ or less, which is less than the density of typical constructive tile products molded from fiber-reinforced cement material. The product is light weight, easy to saw, cut or lathe into shapes, and easy to be fixed using nails, but the drawbacks include its high fragility when cut with an ordinary woodworking tool, low toughness, inability for re-fixing back into the same screw position several times, as well as production of fine powder that is hazardous to the health of workers.

The above-mentioned drawbacks have driven further developments of fiber-reinforced cement material to improve its properties such that it is more applicable in the manufacture of furniture parts. Specifically, it is required for the fiber-reinforced cement material to have a low density, high toughness and flexural strength so that the furniture parts can be easily cut or lathed into shapes as desired, drilled and re-fixed with nails or screws into the same position several times, and do not produce hazardous fine powder when cut.

SUMMARY

The object of the present invention is to provide a fiber-reinforced cement composition which has a low density, high toughness and high flexural strength for utilizing as a material to manufacture furniture parts, wherein the fiber-reinforced cement composition contains no volatile substance, can be molded into lightweight fiber-reinforced cement materials or furniture parts, can be processed using ordinary wood-working tools, can be cut or lathed into desired shapes, and can be drilled or re-fixed with nails or screws into the same position several times.

The present invention achieves the above object by providing a fiber-reinforced cement composition comprising a cement, a fiber, a silica, a filler, expanded perlite and a polymer.

In a preferred embodiment, the fiber-reinforced cement composition has a density in the range of about 0.8 to about 0.9 $g/cm^3$.

In a further preferred embodiment, the fiber-reinforced cement composition has a flexural strength in the range of about 9.5 to about 12 MPa.

In a further preferred embodiment, the fiber-reinforced cement composition has a toughness in the range of about 2,100 to about 2,300 $J/m^2$.

In a further preferred embodiment, the fiber-reinforced cement composition has an amount of the expanded perlite in the range of about 5% to about 15% by weight.

In a further preferred embodiment, the fiber-reinforced cement composition has an amount of the polymer in the range of about 5% to about 15% by weight. More preferably, the polymer is in the form of powder, a slurry, or a suspension, and is selected from the group consisting of acrylonitrile-butadiene-styrene, polyethylene and its derivatives, vinyl acetate and its derivatives, and any combinations thereof.

In a further preferred embodiment, the fiber-reinforced cement composition has an amount of the cement in the range of about 20% to about 40% by weight. More preferably, the cement is a hydraulic cement.

In a further preferred embodiment, the fiber-reinforced cement composition according to any one of the preceding claims, having an amount of the fiber in the range of about 5% to about 10% by weight. More preferably, the fiber is a natural fiber, including cellulose fibers, or at least one synthetic fiber selected from the group consisting of polyvinyl alcohol fiber, polypropylene fiber and any combinations thereof.

In a further preferred embodiment, the fiber-reinforced cement composition has an amount of the silica in the range of about 30% to about 50% by weight. More preferably, the silica is selected from the group consisting of ground sand, fly ash, ground bottom ash, ground rice husk ash, ground quartz, silica fume, microsilica, ground mirror, ground glass, ground blast-furnace slag, and any combinations thereof.

In a further preferred embodiment, the fiber-reinforced cement composition has an amount of the filler in the range of about 3% to about 15% by weight. More preferably, the filler is selected from the group consisting of calcium carbonate powder, marl powder, kaolin powder, and any combinations thereof.

In a further preferred embodiment, the fiber-reinforced cement composition further comprises an additive, including a coloring agent.

In a further embodiment, the present invention provides a fiber-reinforced cement composite material molded from the fiber-reinforced cement composition according to the present invention.

In further embodiment, the present invention provides a furniture product made from the fiber-reinforced cement material according to the present invention.

The aforementioned object and embodiments of the present invention will become apparent upon reading the disclosure of a preferred embodiment of the present invention as described in the Detailed Description.

BRIEF DESCRIPTION OF THE DRAWINGS

No figure.

DETAILED DESCRIPTION

The present invention relates to a composition for fiber-reinforced cement material whose properties are improved in such a manner that it has a low density, a light weight, a high toughness, a high flexural strength, and can be drilled and re-fixed with nails or screws into the same position several times, thus is suitably applicable as a material for manufacturing furniture parts.

The fiber-reinforced cement composition according to the present invention comprises a cement, a fiber, a silica, expanded perlite and a polymer, and may further comprise a filler, additive and water. In preparing the composition for forming a fiber-reinforced cement material, the components of the composition are mixed in a mixing tank at the following preferred component ratio:

cement, in the range of about 20% to about 40% by weight;
fiber, in the range of about 5% to about 10% by weight;
silica, in the range of about 30% to about 50% by weight;
expanded perlite, in the range of about 5% to about 15% by weight;
polymer, in the range of about 5% to about 15% by weight;
filler, in the range of about 3% to about 15% by weight; and
additive and water, in addition to 100% by weight.

A non-limiting example of the preferred cement is hydraulic cement.

The fiber to be used may be natural or synthetic. Non-limiting examples of the preferred natural fiber include cellulose fibers. Non-limiting examples of the preferred synthetic fiber include polyvinyl alcohol fiber, polypropylene fiber and any combinations thereof. The fibers may be organic or inorganic.

The silica to be used may be any materials containing silica. Non-limiting examples of the preferred silica include ground sand, fly ash, ground bottom ash, ground rice husk ash, ground quartz, silica fume, microsilica, ground mirror, ground glass, ground blast-furnace slag, and any combinations thereof.

Herein, the expanded perlite is perlite that has been subjected to a heating process causing the expansion of the material, thus resulting in a lightweight perlite material. Typically, the perlite which has not been subjected to a heating process has a density around 1.1 $g/cm^3$ while typical expanded perlite has a density about 0.03 to 0.15 $g/cm^3$.

Preferably, the polymers to be used include acrylonitrile-butadiene-styrene, polyethylene and its derivatives, vinyl acetate and its derivatives, and any combinations thereof. As for mixing, the polymers can be in the form of powder, a slurry, or a suspension.

The filler to be used may be any filler typically used in this field. Non-limiting examples of the preferred filler include calcium carbonate powder, marl powder, kaolin powder, and any combinations thereof.

A coloring agent may be used as an additive to obtain an enhanced beautiful appearance of the finished products.

The fiber-reinforced cement composition as prepared can be molded into a fiber-reinforced cement material for manufacturing furniture parts. Any suitable molding methods typically used in this field may be used, such as Hatschek process, Magnani process, injection molding, extrusion, hand lay-up, mold casting, filter pressing, flow-on machine process, or roll forming process, etc. Preferred methods include Hatschek process, extrusion, and flow-on machine process. The fiber-reinforced cement composition according to the present invention can be molded into desired shapes and sizes by using a cutting tool or high-pressurized jet of water.

The molding of products is carried out by placing the composition as prepared in a mold and curing the composition for 4 hours in a room in which temperature is controlled at a not more than 80° C. and relative humidity is controlled at not less than 50%. The cured material is then placed in an autoclave, in which temperature is controlled at at least 120° C. and pressure is controlled in the range of about 6 to 10 atm, for at least 4 hours to obtain a fiber-reinforced cement material product. The material is further dehumidified under a temperature in the range between 60° C. and 160° C. for at least one hour to obtain a lightweight fiber-reinforced cement material product. The product may be subjected to surface scrubbing, cutting and/or lathing into furniture parts with desired shape and size.

EXAMPLES

The present invention will be apparent from the following description which demonstrates examples of the invention and is not intended to limit the technical spirit of the invention. The advantageous features of the present invention will be apparent with reference to examples of the invention as well as comparative examples.

Comparative Example 1

A fiber-reinforced cement composition without components of expanded perlite and polymer was prepared by mixing in water 30% by weight of hydraulic cement (as a cement component), 7% by weight of cellulose fiber (as a fiber component), 40% by weight of ground sand (as a silica component), and 23% by weight of calcium carbonate powder (as a filler component). The composition as prepared was molded into plate and cured for not less than 4 hours in a room in which temperature was controlled at between 40° C. and 80° C. and relative humidity was controlled at between 50% and 100%. The cured plate was then placed in an autoclave, in which temperature was controlled at not less than 120° C. and pressure was controlled in the range between 6 atm and 10 atm, for not less than 4 hours, and further dehumidified under a temperature in the range between 60° C. and 160° C. for not less than one hour to obtain a lightweight fiber-reinforced cement material product. The product was tested for flexural strength using a flexural strength testing machine in accordance with ISO 8336 Standard, toughness using a flexural strength testing machine and energy calculation through the area under the flexural strength curve per cross-sectional area at break, density using a testing method in accordance with ISO 8336 Standard, thickness swelling using a testing method in accordance with BS EN 317 Standard, nailing resistance through force per depth of penetration using a testing method in accordance with ASTM D1037 Standard, and number of times that a screw can be screwed into the same position counted after screwing a 3.8-to-4 mm-diameter screw into the product at a depth of 10 to 20 mm, removing the screw from the product, and repeating this procedure until the screw cannot be screwed into the same position. It was found that the product has a flexural strength of 12.7 MPa, a toughness of 973 $J/m^2$, a density of 1.31 $g/cm^3$, a thickness swelling of 0.25%, a nailing resistance of 127.2 N/mm, and number of times that a screw can be screwed into the same position of 3 times.

Comparative Example 2

A fiber-reinforced cement composition without an expanded perlite component and with a polymer component was prepared by mixing in water 30% by weight of hydraulic cement (as a cement component), 7% by weight of cellulose fiber (as a fiber component), 40% by weight of ground sand (as a silica component), 10% by weight of acrylonitrile-butadiene-styrene (as a polymer component), and 13% by weight of calcium carbonate powder (as a filler component). The composition as prepared was molded into a lightweight fiber-reinforced cement material product, and tested for flexural strength, toughness, density, thickness swelling, nailing resistance, and number of times that a screw can be screwed into the same position using the methods as described in Comparative Example 1. It was found that the product has a flexural strength of 12.17 MPa, a toughness of 2,414 $J/m^2$, a density of 1.07 $g/cm^3$, a thickness swelling of 0.25%, a nailing resistance of 65.7 N/mm, and number of times that a screw can be screwed into the same position of 101 times.

Example 1

A fiber-reinforced cement composition with an expanded perlite component and a polymer component was prepared by mixing in water 30% by weight of hydraulic cement (as a cement component), 7% by weight of cellulose fiber (as a fiber component), 40% by weight of ground sand (as a silica component), 5% by weight of expanded perlite (as an expanded perlite component), 10% by weight of acrylonitrile-butadiene-styrene (as a polymer component), and 8% by weight of calcium carbonate powder (as a filler component). The composition as prepared was molded into a lightweight fiber-reinforced cement material product, and tested for flexural strength, toughness, density, thickness swelling, nailing resistance, and number of times that a screw can be screwed into the same position using the methods as described in Comparative Example 1. It was found that the product has a flexural strength of 11.14 MPa, a toughness of 2,211 $J/m^2$, a density of 0.89 $g/cm^3$, a thickness swelling of 0.30%, a nailing resistance of 57.3 N/mm, and number of times that a screw can be screwed into the same position of 97 times.

Example 2

A fiber-reinforced cement composition with an expanded perlite component and a polymer component was prepared by mixing in water 30% by weight of hydraulic cement (as a cement component), 7% by weight of cellulose fiber (as a fiber component), 40% by weight of ground sand (as a silica component), 10% by weight of expanded perlite (as an expanded perlite component), 10% by weight of acrylonitrile-butadiene-styrene (as a polymer component), and 3% by weight of calcium carbonate powder (as a filler component). The composition as prepared was molded into a lightweight fiber-reinforced cement material product, and tested for flexural strength, toughness, density, thickness swelling, nailing resistance, and number of times that a screw can be screwed into the same position using the methods as described in Comparative Example 1. It was found that the product has a flexural strength of 10.04 MPa, a toughness of 2,157 $J/m^2$, a density of 0.81 $g/cm^3$, a thickness swelling of 0.33%, a nailing resistance of 47.6 N/mm, and number of times that a screw can be screwed into the same position of 93 times.

Example 3

A fiber-reinforced cement composition with an expanded perlite component and a polymer component and without a filler component was prepared by mixing in water 30% by weight of hydraulic cement (as a cement component), 7% by weight of cellulose fiber (as a fiber component), 40% by weight of ground sand (as a silica component), 13% by weight of expanded perlite (as an expanded perlite component), and 10% by weight of acrylonitrile-butadiene-styrene (as a polymer component). The composition as prepared was molded into a lightweight fiber-reinforced cement material product, and tested for flexural strength, toughness, density, thickness swelling, nailing resistance, and number of times that a screw can be screwed into the same position using the methods as described in Comparative Example 1. It was found that the product has a flexural strength of 9.50 MPa, a toughness of 2,028 $J/m^2$, a density of 0.78 $g/cm^3$, a thickness swelling of 0.44%, a nailing resistance of 38.2 N/mm, and number of times that a screw can be screwed into the same position of 87 times.

TABLE 1

Compositions and testing results of fiber-reinforced cement materials

| Component | Comparative Example 1 | Comparative Example 2 | Example 1 | Example 2 | Example 3 |
|---|---|---|---|---|---|
| Cement (% by weight) | 30 | 30 | 30 | 30 | 30 |
| Silica (% by weight) | 40 | 40 | 40 | 40 | 40 |
| Fiber (% by weight) | 7 | 7 | 7 | 7 | 7 |
| Expanded perlite (% by weight) | 0 | 0 | 5 | 10 | 13 |
| Polymer (% by weight) | 0 | 10 | 10 | 10 | 10 |
| Filler (% by weight) | 23 | 13 | 8 | 3 | 0 |
| Flexural Strength (MPa) | 12.7 | 12.17 | 11.14 | 10.04 | 9.5 |
| Toughness ($J/m^2$) | 973 | 2,414 | 2,211 | 2,157 | 2,028 |
| Density ($g/cm^3$) | 1.31 | 1.07 | 0.89 | 0.81 | 0.78 |
| Thickness swelling (% of change in thickness as compared to the initial thickness) | 0.25 | 0.25 | 0.30 | 0.33 | 0.44 |
| Nailing resistance (N/mm) | 127.2 | 65.7 | 57.3 | 47.6 | 38.2 |
| Number of times that a screw can be screwed into the same position (times) | 3 | 101 | 97 | 93 | 87 |

Table 1 summarizes the amounts of components of the fiber-reinforced cement materials and the testing results of the lightweight fiber-reinforced cement products obtained in the above comparative examples and examples of the present invention. By comparing the testing results between Comparative Example 1 (without components of expanded perlite and polymer) and Comparative Example 2 (with a polymer component and without an expanded perlite component), it can be seen that the addition of the polymer component to replace an amount of the filler component (i.e. by adding 10% by weight of the polymer component and decreasing the amount of the filler component from 23% to 13% by weight) results in the fiber-reinforced cement product decreasing in density (from 1.31 to 1.07 $g/cm^3$), increasing in toughness (from 973 to 2,414 $J/m^2$), decreasing in nailing resistance (from 127.2 to 65.7 N/mm) and increasing in the number of times that a screw can be screwed into the product at the same position (from 3 times to 101 times).

By comparing the testing results between Comparative Example 2 (with a polymer component and without an expanded perlite component) and Examples 1 to 3 (with a polymer component and an expanded perlite component), it can be seen that, at the same amounts of the cement component, the fiber component and the polymer component (30% by weight of the cement component, 40% by weight of the silica component, 7% by weight of the fiber component, and 10% by weight of the polymer component), the addition of the expanded perlite component to replace an amount of the filler component (i.e. in Example 1, the expanded perlite component was added at 5% by weight while the amount of the filler component was decreased from 13% to 8% by weight; in Example 2, the expanded perlite component was added at 10% by weight while the amount of the filler component was decreased from 13% to 3% by weight; and in Example 3, the expanded perlite component was added at 13% by weight while the amount of the filler component was decreased from 13% by weight to none) results in the fiber-reinforced cement product decreasing in density (from 1.07 to 0.89, 0.81 and 0.78 $g/cm^3$, respectively) and decreasing in nailing resistance (from 65.7 to 57.3, 47.6 and 38.2 N/mm, respectively), while slightly varying in toughness (from 2,414 to 2,211, 2,157 and 2,028 $J/m^2$, respectively), thickness swelling (from 0.25% to 0.30%, 0.33% and 0.44%, respectively) and number of times that a screw can be screwed into the product at the same position (from 101 times to 97 times, 93 times and 87 times, respectively). These results indicate that the fiber-reinforced cement material of the present invention has properties close to those of natural wood or synthetic wood materials, and also possesses advantages owing to its characteristics as being tolerant to humidity, termites and insects, being inflammable as well as not producing hazardous fine powder when cut, drilled and/or lathed that is hazardous to the health of workers.

While the present invention has been described in full detail above, those skilled in the art shall appreciate that various modifications and variations may be made without departing from the spirit and scope of the present invention. The scope of the present invention shall be confined by the appended claims, and shall extend to the characteristics of the invention which, although not specifically stated in the claims, have substantially the same properties, functions and effects as those stated in the claims.

BEST MODE OF THE INVENTION

The same as described in full detail above.

What is claimed is:

1. A fiber-reinforced cement composition comprising a cement, a fiber, a silica, and a filler, said composition further comprising an expanded perlite and a polymer selected from the group consisting of acrylonitrile-butadiene-styrene, polyethylene and its derivatives, vinyl acetate and its derivatives, and any combination thereof.

2. The fiber-reinforced cement composition according to claim 1, having a density in the range of about 0.8 to about 0.9 $g/cm^3$.

3. The fiber-reinforced cement composition according to claim 1, having a flexural strength in the range of about 9.5 to about 12 MPa.

4. The fiber-reinforced cement composition according to claim 1, having a toughness in the range of about 2,100 to about 2,300 $J/m^2$.

5. The fiber-reinforced cement composition according to claim 1, having an amount of the expanded perlite in the range of about 5% to about 15% by weight.

6. The fiber-reinforced cement composition according to claim 1, having an amount of the polymer in the range of about 5% to about 15% by weight.

7. The fiber-reinforced cement composition according to claim 6, wherein the polymer is in the form of powder, a slurry, or a suspension.

8. The fiber-reinforced cement composition according to claim 1, having an amount of the cement in the range of about 20% to about 40% by weight.

9. The fiber-reinforced cement composition according to claim 8, wherein the cement is a hydraulic cement.

10. The fiber-reinforced cement composition according to claim 1, having an amount of the fiber in the range of about 5% to about 10% by weight.

11. The fiber-reinforced cement composition according to claim 10, wherein the fiber is a natural fiber.

12. The fiber-reinforced cement composition according to claim 11, wherein the natural fiber is a cellulose fiber.

13. The fiber-reinforced cement composition according to claim 10, wherein the fiber is a synthetic fiber.

14. The fiber-reinforced cement composition according to claim 13, wherein the synthetic fiber is selected from the group consisting of polyvinyl alcohol fiber, polypropylene fiber and any combinations thereof.

15. The fiber-reinforced cement composition according to claim 1, having an amount of the silica in the range of about 30% to about 50% by weight.

16. The fiber-reinforced cement composition according to claim 15, wherein the silica is selected from the group consisting of ground sand, fly ash, ground bottom ash, ground rice husk ash, ground quartz, silica fume, microsilica, ground mirror, ground glass, ground blast-furnace slag, and any combinations thereof.

17. The fiber-reinforced cement composition according to claim 1, having an amount of the filler in the range of about 3% to about 15% by weight.

18. The fiber-reinforced cement composition according to claim 17, wherein the filler is selected from the group consisting of calcium carbonate powder, marl powder, kaolin powder, and any combinations thereof.

19. A fiber-reinforced cement composition comprising about 30% by weight of a cement, about 7% by weight of a fiber, about 40% by weight of a silica, about 10% by weight of a polymer, about 5% to about 13% by weight of expanded perlite, and about 0% to about 8% by weight of a filler.

20. The fiber-reinforced cement composition according to claim 19, further comprising an additive, including a coloring agent.

21. A fiber-reinforced cement composite material formed from the fiber-reinforced cement composition according to claim 1.

22. A furniture product made from the fiber-reinforced cement composition according to claim 1.

* * * * *